(12) United States Patent
Palm et al.

(10) Patent No.: US 11,359,790 B2
(45) Date of Patent: Jun. 14, 2022

(54) OPTICAL DEVICE FOR MODIFYING A LIGHT DISTRIBUTION

(71) Applicant: Ledil Oy, Salo (FI)

(72) Inventors: Joni Palm, Perniö (FI); Kimmo Harjunpää, Halikko (FI)

(73) Assignee: LEDIL OY, Salo (FI)

( * ) Notice: Subject to any disclaimer, the term of this patent is extended or adjusted under 35 U.S.C. 154(b) by 21 days.

(21) Appl. No.: 17/011,531

(22) Filed: Sep. 3, 2020

(65) Prior Publication Data
US 2021/0071843 A1    Mar. 11, 2021

(30) Foreign Application Priority Data

Sep. 11, 2019  (FI) ...................................... 20195750

(51) Int. Cl.
*F21V 5/04* (2006.01)
*F21K 9/69* (2016.01)
(Continued)

(52) U.S. Cl.
CPC ........ *F21V 5/045* (2013.01); *B29D 11/00019* (2013.01); *B29D 11/0048* (2013.01); *F21K 9/69* (2016.08); *G02B 3/08* (2013.01)

(58) Field of Classification Search
CPC .................................. F21V 5/04; F21V 5/046
See application file for complete search history.

(56) References Cited

U.S. PATENT DOCUMENTS

2007/0268694 A1 * 11/2007 Bailey ..................... H01L 33/54
    362/231
2009/0207586 A1 * 8/2009 Arai ................... G02B 19/0014
    362/97.1
(Continued)

FOREIGN PATENT DOCUMENTS

EP    1 717 627         11/2006
EP    1 717 627 A1      11/2006
(Continued)

OTHER PUBLICATIONS

Search Report issued in European Patent Application No. 20 19 1204 dated Dec. 14, 2020.
(Continued)

*Primary Examiner* — Andrew J Coughlin
(74) *Attorney, Agent, or Firm* — Nixon & Vanderhye

(57) ABSTRACT

An optical device (201) comprises a lens (205) having a light ingress surface (206) and a light egress surface (207). The light ingress surface comprises one or more V-shaped projections on a center area (208) of the light ingress surface and the light ingress surface is free from corners on areas (209) outside the center area. Each V-shaped projection is shaped so that a surface penetration takes place when a light beam arrives at a side surface of the V-shaped projection and a total internal reflection takes place when the light beam arrives at the other side surface of the V-shaped projection. Thus, obliquely arriving light beams emitted by edge areas of a light emitting surface (213) of a light source (202) are mixed better with light beams emitted by other areas of the light emitting surface. Therefore, undesired color variations within a light distribution pattern are reduced.

14 Claims, 3 Drawing Sheets

(51) Int. Cl.
*B29D 11/00* (2006.01)
*G02B 3/08* (2006.01)

(56) References Cited

U.S. PATENT DOCUMENTS

| | | |
|---|---|---|
| 2010/0006877 A1 | 1/2010 | Chen |
| 2010/0085763 A1 | 4/2010 | Aguglia |
| 2013/0044475 A1 | 2/2013 | Hutchens |
| 2013/0194795 A1* | 8/2013 | Onaka ................ G02B 19/0066 362/231 |
| 2013/0250581 A1 | 9/2013 | Tang et al. |
| 2018/0087751 A1 | 3/2018 | Jung et al. |
| 2018/0294389 A1 | 10/2018 | Tarsa et al. |

FOREIGN PATENT DOCUMENTS

| | | |
|---|---|---|
| EP | 3 495 723 A1 | 6/2019 |
| JP | 2003-158302 A | 5/2003 |

OTHER PUBLICATIONS

Search Report for FI Application No. 20195750 dated Mar. 13, 2020, 2 pages.

* cited by examiner

OPTICAL DEVICE FOR MODIFYING A LIGHT DISTRIBUTION

This application claims priority to FI Patent Application No. 20195750 filed Sep. 11, 2019, the entire contents of each of which are hereby incorporated by reference.

FIELD OF THE DISCLOSURE

The disclosure relates generally to illumination engineering. More particularly, the disclosure relates to an optical device for modifying a distribution of light produced by a light source that may comprise, for example but not necessarily, one or more light emitting diodes "LED".

BACKGROUND

Distribution of light produced by a light source can be important or even critical in some applications. The light source may comprise, for example but not necessarily, one or more light emitting diodes "LED", one or more filament lamps, or one or more gas-discharge lamps. The distribution of light produced by a light source can be modified with optical devices such as lenses, reflectors, and combined lens-reflector devices that comprise sections which act as lenses and sections which act as reflectors. FIG. 1 shows a section view of an exemplifying optical device 101 according to the prior art for modifying a distribution of light emitted by a light source 102. The optical device 101 can be for example an elongated element so that the section shown in FIG. 1 is a cross-section of the optical device 101 and the cross-section is the same over a longitudinal length parallel with the z-axis of a coordinate system 199. For another example, the optical device 101 can be rotationally symmetric with respect to the y-axis of the coordinate system 199. In this exemplifying case, the light source 102 is a light emitting diode that comprises a semiconductor part 103 emitting blue light and yellow phosphorus 104 that converts the blue light into light having a plurality of wavelengths.

In many cases, the light source 102 is unideal so that light emitted by a center area of a light emitting surface "LES" of the light source 102 has a different wavelength distribution than light emitted by edge areas of the light emitting surface. Typically, wavelengths corresponding to blue are dominant in the light emitted by the center area whereas wavelengths corresponding to yellow are dominant in the light emitted by the edge areas. Light emitted by areas between the above-mentioned center area and edge areas can be white i.e. have a balanced mix of different wavelengths. In FIG. 1, an exemplifying light beam emitted by the center area is depicted with a reference 151, an exemplifying light beam emitted by an edge area is depicted with a reference 152, and an exemplifying light beam emitted by an area between the above-mentioned center area and edge area is depicted with a reference 153.

Because many light sources are unideal in the way described above, it is typically wanted that the optical device 101 mixes light components emitted by different areas of the light emitting surface of the light source 102. Especially, obliquely arriving light beams emitted by the edge areas of the light emitting surface, such as the light beam 152, are challenging to be controlled so that a desired mix of different wavelengths would be achieved over the whole distribution pattern of the light. Typically, the mix of different wavelengths is wanted to be such that the light is white. A known approach to solve the above-mentioned problem is to provide a light ingress surface and/or a light egress surface of an optical device with textures and/or roughening to mix light components having different wavelengths. Drawbacks of the textures and roughening is that they reduce the efficiency of the optical device by reflecting light backwards towards the light source. Furthermore, the textures and roughening may scatter light to undesired directions and thus the shape of the light distribution pattern deviates from a desired shape.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new optical device for modifying a distribution of light produced by a light source.

An optical device according to the invention is made of transparent material, and the optical device comprises a lens having a light ingress surface and a light egress surface. The light ingress surface comprises one or more V-shaped projections on a center area of the light ingress surface, and the light ingress surface is free from corners on areas outside the center area. Each V-shaped projection is shaped so that a surface penetration takes place when a light beam arrives at a side surface of the V-shaped projection and a total internal reflection "TIR" takes place in response to a situation in which the above-mentioned light beam arrives at the other side surface of the V-shaped projection under consideration.

The one or more V-shaped projections direct especially obliquely arriving light beams emitted by edge areas of a light emitting surface "LES" of a light source towards a center area of a light distribution pattern. Thus, the obliquely arriving light beams emitted by the edge areas are mixed better with light beams emitted by other areas of the light emitting surface. Therefore, undesired color variations within the light distribution pattern are reduced.

In accordance with the invention, there is provided also a new light fixture that comprises:
  a light source, and
  an optical device according to the invention for modifying a distribution of light emitted by the light source.

A light emitting surface of the light source is located symmetrically with respect to the center area of the light ingress surface of the lens of the optical device. The light source can be for example a light emitting diode "LED".

In accordance with the invention, there is provided also a new mold having a form suitable for manufacturing, by mold casting, a piece of transparent material, e.g. plastic, having a shape of an optical device according to the invention.

Various exemplifying and non-limiting embodiments are described in accompanied dependent claims.

Exemplifying and non-limiting embodiments both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below with reference to the accompanying drawings, in which:

FIG. 1 has already been explained in the Background-section of this document.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
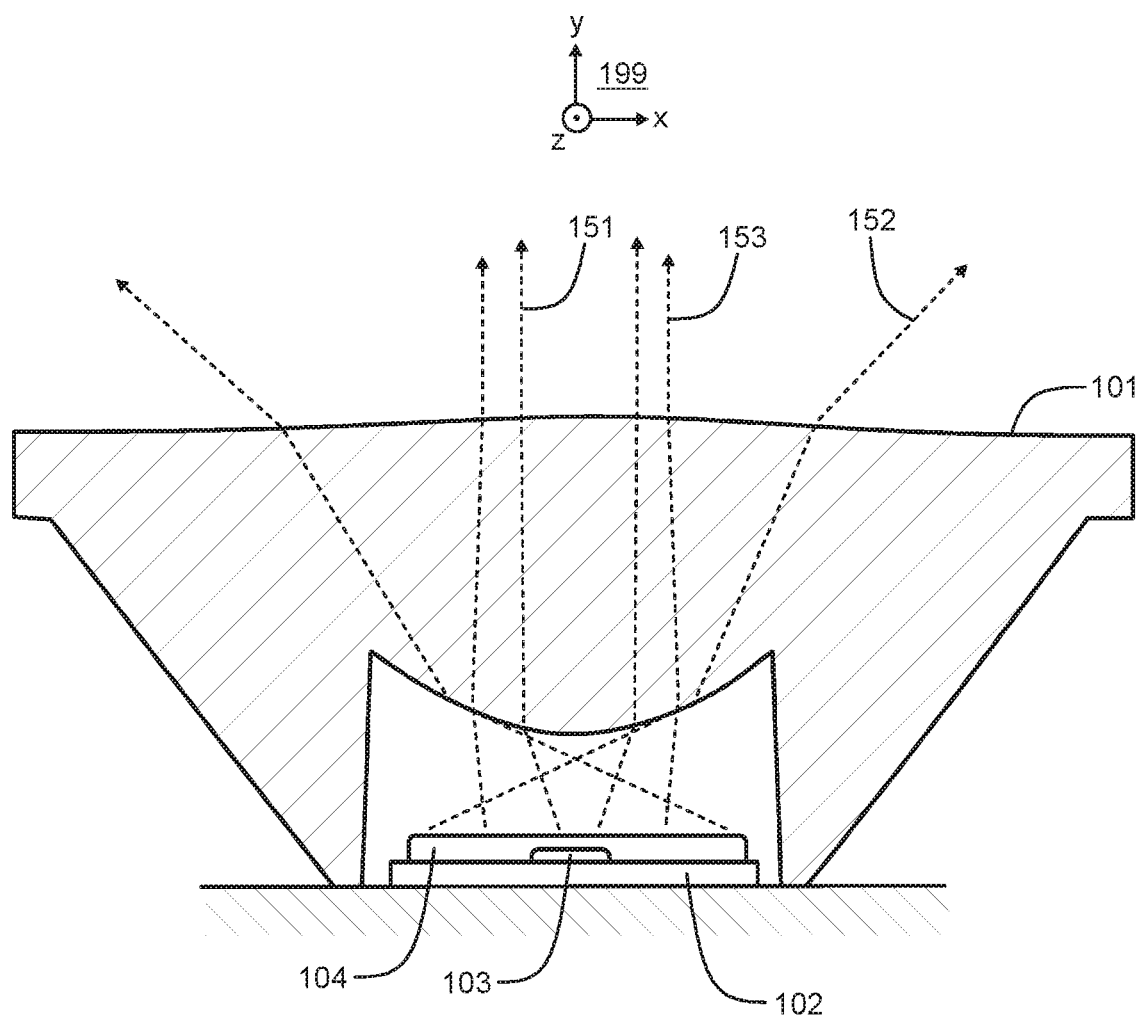
FIG. 1 illustrates an optical device according to the prior art for modifying a light distribution.
Figure 2:
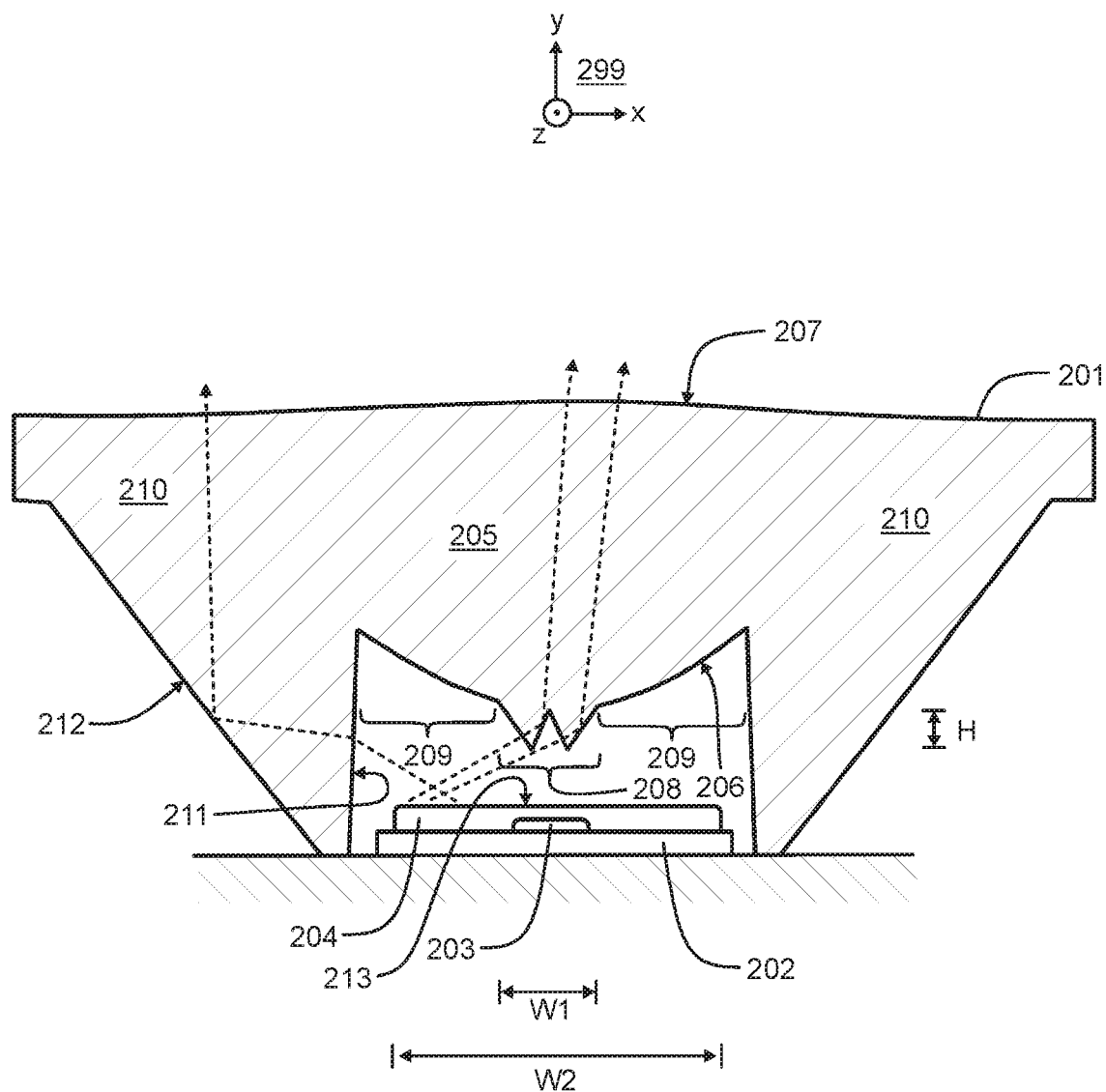
FIG. 2 illustrates an optical device according to an exemplifying and non-limiting embodiment for modifying a light distribution.

FIG. 2 shows a section view of an optical device 201 according to an exemplifying and non-limiting embodiment for modifying a distribution of light emitted by a light source 202. The geometric section plane is parallel with the xy-plane of a coordinate system 299. The optical device 201 can be for example an elongated element so that the section shown in FIG. 2 is a cross-section of the optical device 201 and the cross-section is the same over a longitudinal length parallel with the z-axis of the coordinate system 299. For another example, the optical device 201 can be rotationally symmetric with respect to the y-axis of the coordinate system 299. The optical device 201 is made of transparent material whose refractive index is greater than one. The transparent material can be for example acrylic plastic, polycarbonate, optical silicone, or glass. A method of manufacture of the optical device 201 can be for example mold casting. In the exemplifying case shown in FIG. 2, the light source 202 is a light emitting diode "LED" that comprises a semiconductor part 203 emitting blue light and yellow phosphorus 204 that converts the blue light into light having a plurality of wavelengths.

The optical device 201 comprises a lens 205 that has a light ingress surface 206 and a light egress surface 207. The light ingress surface 206 comprises V-shaped projections on a center area 208 of the light ingress surface 206, and the light ingress surface 206 is free from corners on areas 209 outside the center area 208. In the exemplifying optical device 201 illustrated in FIG. 2, the light ingress surface 206 is convex on the areas 209 outside the center area 208. It is also possible that the light ingress surface 206 is concave or planar on the areas 209 outside the center area 208. The section view shown in FIG. 2 exhibits two V-shaped projections side-by-side so that there is a V-shaped recess between the V-shaped projections. In an exemplifying case where the optical device 201 is an elongated element whose cross-section is the same over a longitudinal length parallel with the z-axis of the coordinate system 299, the optical device 201 comprises two V-shaped projections which are elongated in the z-direction of the coordinate system 299. In another exemplifying case where the optical device 201 is rotationally symmetric with respect to the y-axis of the coordinate system 299, the optical device 201 comprises a ring-shaped ridge so that the section view shown in FIG. 2 exhibits the two V-shaped projections.

In FIG. 2, exemplifying light beams are depicted with arrow-headed dashed lines. As illustrated in FIG. 2, a surface penetration takes place when a light beam arrives at a side surface of each V-shaped projection and a total internal reflection "TIR" takes place in response to a situation in which the light beam arrives at the other side surface of the V-shaped projection under consideration. The V-shaped projections direct especially obliquely arriving light beams emitted by edge areas of a light emitting surface "LES" 213 of the light source 202 towards a center area of a light distribution pattern. Thus, the obliquely arriving light beams emitted by the edge areas are mixed better with light beams emitted by other areas of the light emitting surface 213. Therefore, undesired color variations within the light distribution pattern are reduced.

The exemplifying optical device 201 illustrated in FIG. 2 comprises a reflector section 210 bordering the lens 205. The reflector section 210 comprises a light ingress surface 211 bordering the light ingress surface 206 of the lens 205. The reflector section 210 comprises a reflector surface 212 for reflecting light arrived through the light ingress surface 211 of the reflector section 210 so that a total internal reflection "TIR" takes place on the reflector surface 212. In an exemplifying case where the optical device 201 is an elongated element whose cross-section is the same over a longitudinal length parallel with the z-axis of the coordinate system 299, the reflector section 210 is on both sides of the lens 205. In another exemplifying case where the optical device 201 is rotationally symmetric with respect to the y-axis of the coordinate system 299, the reflector section 210 surrounds the lens 205.

In an optical device according to an exemplifying and non-limiting embodiment, the surface area of the center area 208 is at most 15% of the surface area of the areas 209 outside the center area. In an optical device according to an exemplifying and non-limiting embodiment, the surface area of the center area 208 is at most 20% of the surface area of the areas 209 outside the center area. In an optical device according to an exemplifying and non-limiting embodiment, the surface area of the center area 208 is at most 30% of the surface area of the areas 209 outside the center area.

The optical device 201 and the light source 202 constitute a light fixture according to an exemplifying and non-limiting embodiment. The light source 202 is mechanically supported with respect to the optical device 201 so that the light emitting surface 213 of the light source 202 is located symmetrically with respect to the center area 208 of the light ingress surface 206.

In a light fixture according to an exemplifying and non-limiting embodiment, the width W1 of the center area 208 of the light ingress surface 206 is in the range from 25% to 80% of the width W2 of the light emitting surface 213 of the light source 202.

In a light fixture according to an exemplifying and non-limiting embodiment, a distance from the tips of the V-shaped projections of the light ingress surface 206 to the light emitting surface 213 of the light source 202 is in the range from 25% to 50% of the width W2 of the light emitting surface 213 of the light source 202.

In a light fixture according to an exemplifying and non-limiting embodiment, a z-directional height H of the V-shaped projections of the light ingress surface 206 is in the range from 5% to 25% of the width W2 of the light emitting surface 213 of the light source 202.

Figure 3A:
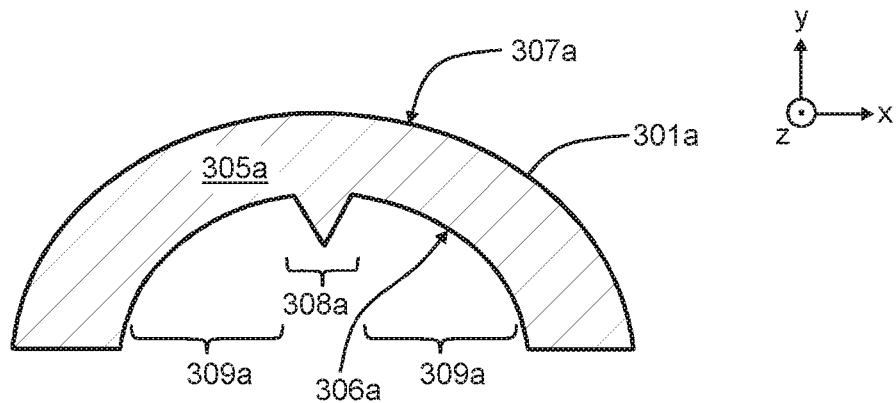
FIGS. 3a-3c illustrate optical devices according to exemplifying and non-limiting embodiments for modifying a light distribution.
Figure 3B:
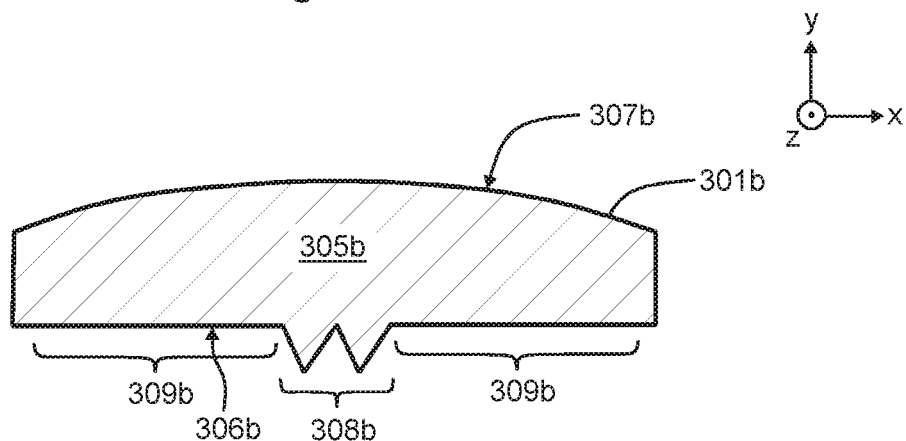
Figure 3C:
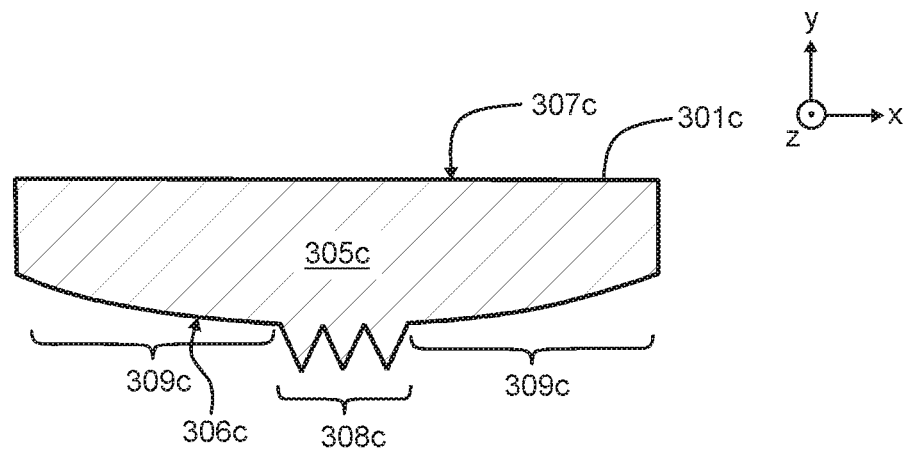

FIGS. 3a-3c illustrate optical devices 301a, 301b, and 301c according to exemplifying and non-limiting embodiments for modifying a light distribution. The exemplifying optical device 301a illustrated in FIG. 3a comprises a lens 305a that has a light ingress surface 306a and a light egress surface 307a. The light ingress surface 306a comprises a single V-shaped projection on a center area 308a of the light ingress surface 306a, and the light ingress surface 306a is free from corners on areas 309a outside the center area 308a. In the exemplifying optical device 301a, the light ingress surface 306a is concave on the areas 309a outside the center area 308a and the light egress surface 307a is convex.

The exemplifying optical device 301b illustrated in FIG. 3b comprises a lens 305b that has a light ingress surface 306b and a light egress surface 307b. The light ingress surface 306b comprises two V-shaped projections on a center area 308b of the light ingress surface 306b, and the light ingress surface 306b is free from corners on areas 309b outside the center area 308b. In the exemplifying optical device 301b, the light ingress surface 306b is planar on the areas 309b outside the center area 308b and the light egress surface 307b is convex.

The exemplifying optical device 301c illustrated in FIG. 3c comprises a lens 305c that has a light ingress surface 306c and a light egress surface 307c. The light ingress surface 306c comprises three V-shaped projections on a center area 308c of the light ingress surface 306c, and the light ingress surface 306c is free from corners on areas 309c outside the center area 308c. In the exemplifying optical device 301c, the light ingress surface 306c is convex on the areas 309c outside the center area 308c and the light egress surface 307c is planar.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical device for modifying a light distribution, the optical device being made of transparent material and comprising a lens having a light ingress surface and a light egress surface, wherein the light ingress surface comprises one or more V-shaped projections on a center area of the light ingress surface and the light ingress surface is free from corners on areas outside the center area, each V-shaped projection being shaped so that a surface penetration takes place when a light beam arrives at one of side surfaces of the V-shaped projection and a total internal reflection takes place in response to a situation in which the light beam arrives at another one of the side surfaces of the V-shaped projection under consideration, and wherein a surface area of the center area of the light ingress surface of the lens is at most 30% of a surface area of the areas outside the center area.

2. An optical device according to claim 1, wherein the center area of the light ingress surface of the lens comprises at least two V-shaped projections side-by-side so that there is a V-shaped recess between adjacent ones of the V-shaped projections.

3. An optical device according to claim 1, wherein the optical device further comprises a reflector section bordering the lens, the reflector section comprising a light ingress surface bordering the light ingress surface of the lens and a reflector surface for reflecting light arrived through the light ingress surface of the reflector section.

4. An optical device according to claim 1, wherein the light ingress surface of the lens is convex on the areas outside the center area.

5. An optical device according to claim 1, wherein the light ingress surface of the lens is concave on the areas outside the center area.

6. An optical device according to claim 1, wherein the light ingress surface of the lens is planar on the areas outside the center area.

7. An optical device according to claim 1, wherein light egress surface of the lens is convex.

8. An optical device according to claim 1, wherein the light egress surface of the lens is planar.

9. An optical device according to claim 1, wherein the optical device is an elongated piece of the transparent material so that a cross-sectional shape of the elongated piece is a same over a longitudinal length of the elongated piece.

10. An optical device according to claim 1, wherein the optical device is rotationally symmetric with respect to a geometric axis intersecting the center area of the light ingress surface of the lens and a center point of the light egress surface of the lens.

11. An optical device according to claim 1, wherein the transparent material is one of the following: acrylic plastic, polycarbonate, optical silicone, glass.

12. A light fixture comprising:
a light source, and
an optical device for modifying a distribution of light emitted by the light source,
the optical device being made of transparent material and comprising a lens having a light ingress surface and a light egress surface, wherein the light ingress surface comprises one or more V-shaped projections on a center area of the light ingress surface and the light ingress surface is free from corners on areas outside the center area, each V-shaped projection being shaped so that a surface penetration takes place when a light beam arrives at one of side surfaces of the V-shaped projection and a total internal reflection takes place in response to a situation in which the light beam arrives at another one of the side surfaces of the V-shaped projection under consideration, wherein a light emitting surface of the light source is located symmetrically with respect to the center area of the light ingress surface of the lens of the optical device, and wherein a surface area of the center area of the light ingress surface of the lens is at most 30% of a surface area of the areas outside the center area.

13. A light fixture according to claim 12, wherein a width of the center area of the light ingress surface of the lens is in a range from 25% to 80% of a width of the light emitting surface of the light source.

14. A mold having a form suitable for manufacturing, by mold casting, a transparent piece constituting an optical device made of transparent material and comprising a lens having a light ingress surface and a light egress surface, wherein the light ingress surface comprises one or more V-shaped projections on a center area of the light ingress surface and the light ingress surface is free from corners on areas outside the center area, each V-shaped projection being shaped so that a surface penetration takes place when a light beam arrives at one of side surfaces of the V-shaped projection and a total internal reflection takes place in response to a situation in which the light beam arrives at another one of the side surfaces of the V-shaped projection under consideration, wherein a light emitting surface of the light source is located symmetrically with respect to the center area of the light ingress surface of the lens of the optical device, and wherein a surface area of the center area of the light ingress surface of the lens is at most 30% of a surface area of the areas outside the center area.

\* \* \* \* \*